United States Patent [19]

Rezanka

[11] Patent Number: 4,571,599

[45] Date of Patent: Feb. 18, 1986

[54] INK CARTRIDGE FOR AN INK JET PRINTER

[75] Inventor: Ivan Rezanka, Pittsford, N.Y.

[73] Assignee: Xerox Corporation, Stamford, Conn.

[21] Appl. No.: 677,426

[22] Filed: Dec. 3, 1984

[51] Int. Cl.[4] .................. G01D 15/16

[52] U.S. Cl. .................. 346/140 R

[58] Field of Search .................. 346/140

[56] References Cited

U.S. PATENT DOCUMENTS

| | | | |
|---|---|---|---|
| 3,708,798 | 1/1973 | Hildenbrand et al. | 346/140 |
| 4,306,245 | 12/1981 | Kasugayama et al. | 346/140 R |
| 4,342,041 | 7/1982 | Kasugayama et al. | 346/140 R |
| 4,383,263 | 5/1983 | Ozawa et al. | 346/140 R |
| 4,419,678 | 12/1983 | Kasugayama | 346/140 |
| 4,456,916 | 6/1984 | Kocot | 346/140 R |
| 4,463,362 | 7/1984 | Thomas | 346/140 R |
| 4,500,895 | 2/1985 | Buck | 346/140 |
| 4,509,062 | 4/1985 | Low | 346/140 |
| 4,511,906 | 4/1985 | Hara | 346/140 |
| 4,532,530 | 7/1985 | Hawkins | 346/140 R |

FOREIGN PATENT DOCUMENTS

| | | |
|---|---|---|
| 212039 | 11/1960 | Austria . |
| 54117503 | 4/1981 | Japan . |

*Primary Examiner*—Joseph W. Hartary
*Attorney, Agent, or Firm*—Robert A. Chittum

[57] ABSTRACT

A plurality of disposable, individually replaceable ink supply cartridges are mountable on the carriage of an ink jet printer. Each cartridge has a thermal printhead fixedly attached thereto. A constant slightly negative pressure is maintained at the nozzles of the printhead by means of a secondary reservoir with a level of ink maintained below the ink supply. The majority of the ink is stored in a hermetically sealed main reservoir in the cartridge which contains the ink supply at the negative pressure. A passageway provides ink from the main reservoir to the printhead nozzles. The secondary reservoir holds an air pocket at atmospheric pressure and releases air into the main reservoir as required to maintain the desired negative pressure constant therein as the ink supply is depleted. The passageway entrance is sized to maintain a meniscus when the cartridge is tilted to prevent loss of the desired nozzle pressure by air from the second reservoir. A membrane filter passes air to the secondary reservoir, but is impervious to ink. Means to reduce the effects of fluid inertia on the ink caused by sudden changes of printing duty cycles is optionally provided.

13 Claims, 9 Drawing Figures

INK CARTRIDGE FOR AN INK JET PRINTER

BACKGROUND OF THE INVENTION

1. Field of the Invention

This invention relates to ink supply cartridges for ink jet printers and more particularly to disposable ink cartridges which supply the ink to thermal ink jet printheads integrally mounted thereon.

2. Description of the Prior Art

Ink jet printing systems are usually divided into two basic types, continuous stream and drop-on-demand. In continuous stream ink jet printing systems, ink is emitted in a continuous stream under pressure through one or more orifices or nozzles. The stream is perturbed, so that it is broken into droplets at determined, fixed distances from the nozzles. At the breakup point, the droplets are charged in accordance with varying magnitudes of voltages representative of digitized data signals. The charged droplets are propelled through a fixed electrostatic field which adjusts or deflects the trajectory of each droplet in order to direct it to a specific location on a recording medium, such as paper, or to a gutter for collection and recirculation. In drop-on-demand ink jet printing systems, a droplet is expelled from a nozzle directly to the recording medium along a substantially straight trajectory that is substantially perpendicular to the recording medium. The droplet expulsion is in response to digital information signals, and a droplet is not expelled unless it is to be placed on the recording medium. Except for periodic concurrent expulsion of droplets from all nozzles into a receptacle to keep the ink menisci in the nozzles from drying, drop-on-demand systems require no ink recovering gutter to collect and recirculate the ink and no charging or deflection electrodes to guide the droplets to their specific pixel locations on the recording medium. Thus, drop-on-demand systems are much simpler than the continuous stream type.

There are two basic propulsion techniques for the drop-on-demand ink jet printers. One uses a piezoelectric transducer to produce pressure pulses selectively to expel the droplets and the other technique uses thermal energy, usually the momentary heating of a resistor, to produce a vapor bubble in the ink, which during its growth expels a droplet. Either technique uses ink-filled channels or passageways which interconnect an orifice or nozzle and an ink-filled manifold. The pressure pulse may be generated anywhere in the channels or the manifold. However, the bubble generating resistor (hence the name bubble jet) must be located in each channel near the nozzle.

The thermal ink jet printers, sometimes referred to as bubble jet printers, are very powerful because they produce high velocity droplets and permit very close nozzle spacing for printing higher numbers of spots or pixels per inch on the recording medium. The higher the number of spots per inch, the better the printing resolution, thus yielding higher quality printing.

In thermal ink jet printers, printing signals representing binary digital information originate an electric current pulse of a predetermined time duration in a small resistor within each ink channel near the nozzle, causing the ink in the immediate vicinity to evaporate almost instantaneously and create a vapor bubble. The ink at the orifice is forced out as a propelled droplet by the bubble. At the termination of the current pulse, the bubble collapses and the process is ready to start all over again as soon as hydrodynamic motion or turbulence of the ink stops. The turbulence in the channel generally subsides in fractions of milliseconds so that thermally expelled droplets may be generated in the kilohertz range. For more detailed explanation of the operation and construction of a thermal ink jet printer refer to copending U.S. application Ser. No. 588,166 to W. G. Hawkins filed on Mar. 9, 1984 now U.S. Pat. No. 4,532,530.

Existing thermal ink jet printers usually have a printhead mounted on a carriage which traverses back and forth across the width of a stepwise movable recordng medium. The printhead generally comprises a vertical array of nozzles which confronts the recording medium. Ink-filled channels connect to an ink supply reservoir, so that as the ink in the vicinity of the nozzles is used, it is replaced from the reservoir. Small resistors in the channels near the nozzles are individually addressable by current pulses representative of digitized information or video signals, so that each droplet expelled and propelled to the recording medium prints a picture element or pixel.

Typical thermal ink jet printers encounter several problems. Constant predetermined ink pressure at the nozzles has to be maintained, while the level of ink in the supply reservoir is changing as the ink is spent. To prevent ink from contaminating the front face of the printhead, because of ink weeping from the nozzles, a slight negative pressure is required. Also, the ink in the nozzles has to be isolated from pressure transients generated in the reservoir by the carriage motion, and whenever more than one nozzle is used, crosstalk between nozzles must be prevented. By crosstalk it is meant that the activation of one nozzle to propel a droplet therefrom causes an undesired effect on a droplet expelled from an adjacent nozzle, such as a change in its size, velocity or direction. Any of these changes in droplet parameters cause defective printing or impact print quality. Several approaches to the solution of these problems are evident in the prior art, as delineated below, but none have entirely solved them.

U.S. Pat. No. 4,463,362 to Thomas discloses an ink jet printing system having baffle plates in a movable reservoir accommodating a plurality of print heads. The plates prevent the printing ink from sloshing back and forth during movement of the reservoir to ensure that a supply of ink is maintained in the flexible supply tubes to the printheads.

Japanese patent application No. 54-117503 filed Sept. 12, 1979 and published without examination on Apr. 16, 1981 discloses a thermal drop-on-demand ink jet printer having a printhead and ink reservoir combination movably mounted on a carriage. The reservoir is partitioned into an upper chamber adjacent the printhead and a lower chamber. The upper chamber is supplied from the lower chamber by a small tube by capillary force.

Austrian patent specification No. 212,039 published Nov. 25, 1960 discloses an ink reservoir with a baffle that partitions the reservoir into two sections. The ink is supplied through a tube by the differences of heights of ink levels in the two sections.

U.S. Pat. No. 4,306,245 to Kasugayama et al discloses an ink jet printing arrangement having a movable integral printhead and ink reservoir wherein the printhead is fed ink through a tube from the reservoir by capillary action. The ink in the reservoir is maintained at atmospheric pressure and may have a filter to pass air but not liquid.

U.S. Pat. No. 4,342,041 to Kasugayama et al discloses an ink jet printer of the type having a printhead mounted on a carriage and adapted for reciprocation. The printer has two ink reservoirs. One small reservoir is integrally formed with the printhead and the main large reservoir is fixedly mounted at a different location. A flexible supply hose connects the two reservoirs and the hose is adapted to swing about a fixed point during carriage reciprocation. As a result of this swinging motion, the ink in the supply hose is subjected to a centrifugal force which produces a pumping effect that automatically supplies ink from the main reservoir to the small one. Since the capacity of the ink reservoir that is integral with the printhead is extremely small, the change of weight on the carriage is negligible as the ink is consumed. Therefore, there is caused no change of carriage running speed by weight change, when a linear motor is used as the carriage driving motor. Also, bubbles transported from the main reservoir are dissipated in the small reservoir since both are vented to atmosphere.

U.S. Pat. No. 4,383,263 to Ozawa et al discloses several embodiments of a drop-on-demand ink jet printing system. The printhead is integral with a sub-tank which is connected to a suction means and a main tank. The sub-tank is maintained at a negative pressure and a tube feeds ink to the printhead from the bottom of the sub-tank.

U.S. Pat. No. 3,708,798 to Hildenbrand et al discloses an ink jet printer having a collapsible ink supply bag that supplies ink to a printhead at a constant pressure through a manifold with an air bubble trap. The manifold is capable of manual venting and is interconnected to the printhead by hoses.

U.S. Pat. No. 4,456,916 to Kocot discloses an ink jet printer having a reciprocating printhead. A disposable cartridge forms part of the printhead and includes a nozzle and a multicompartment ink reservoir. One reservoir compartment supplies ink to the nozzle. A float in one compartment is periodically actuated to force ink over a wall that forms the different compartments to maintain the proper height in the one that supplies ink to the nozzle to replenish the ink used.

SUMMARY OF THE INVENTION

It is the object of this invention to provide an improved, disposable ink supply cartridges having a thermal ink jet printhead integral therewith for use in a carriage type thermal ink jet printer.

It is another object of the invention to provide a plurality of disposable ink supply cartridges with associated thermal ink jet printheads for use in a carriage type thermal ink jet printer, each cartridge being capable of holding different colored inks for multicolored printing by the printer and each cartridge being adapted for individual replacement.

It is still another object of this invention to provide a disposable ink supply cartridge and printhead combination for a carriage type thermal ink jet printer which maintains a constant predetermined ink pressure at the nozzles of the printhead, prevents ink from weeping from the nozzles, isolates the ink in the vicinity of the nozzles from pressure transients produced in the cartridge by the carriage motion, and eliminates crosstalk between nozzles.

In accordance with this invention, one or more disposable, individually replaceable ink supply cartridges, with each having an integral printhead, are installed on a carriage for reciprocal movement across the width of a recording medium, such as paper. After each swath or stripe of data is printed during movement of the carriage in one direction, the recording medium is stepped the distance of the printed stripe height for continued printing of the next contiguous stripe of information as the carriage moves in the other direction. A constant slightly negative pressure is maintained at the nozzles of the printhead by the use of hermetically sealed main chamber in the cartridge having a negative pressure and smaller secondary chamber which contains an air bubble at atmospheric pressure. The thermal printhead is fixedly mounted on the cartridge at a location above the secondary chamber. A passageway is formed in the cartridge by an internal wall which extends between the bottom of the cartridge adjacent the secondary chamber and the printhead. An opening in the cartridge wall that forms part of the passageway is concentric with a confronting opening in the printhead to enable ink to be fed to the printhead as the ink is used by the expulsion of droplets therefrom. As ink is used by the printhead, the ink level in the second chamber is lowered to release a small air bubble and into the main chamber, thus allowing the ink level in the secondary chamber to return to its original level. The ink pressure at the nozzles is maintained constant by the difference in height between the printhead nozzles and the opposite end of the passageway. The air in the secondary chamber is maintained at atmospheric pressure via another opening in the cartridge which is sealed by a membrane which passes air but is impervious to ink and, of course, dust particles. A gap is formed between the bottom of the cartridge and the confronting end of the passageway internal wall. The gap has a dimensional range that enables the forming of a meniscus in case the cartridge is tilted during, for example, installation or the performance of maintenance or the like, and ink is removed from the vicinity of the gap. The meniscus thus formed at this location will hold the ink in the passageway and prevent the entrance of air from the secondary chamber.

Alternate embodiments provide an air pocket either at the top of the ink feeding passageway or one in the printhead itself to lessen the inertial effect caused by, for example, the sudden propulsion of droplets from a large percentage of the nozzles, as in a start of printing operation, or the inertial effect caused by the sudden stoppage of printing. The inertial effect referred to is the sudden change in the stable state of the ink, for example, from a stable non-moving state to a moving condition or the reverse. Another embodiment employs a breakaway internal seal to keep the ink encapsulated until the cartridge is installed in the printer. One embodiment uses a tube to pass air bubbles from the secondary chamber to the main reservoir chamber and a flexible seal that closes or opens access to the tube to permit escape of the air bubble from the secondary chamber to the main reservoir chamber. Additionally, the tube end located in the main chamber is sealed by a membrane previous to air but impervious to the ink.

DESCRIPTION OF THE PREFERRED EMBODIMENT

Figure 1:
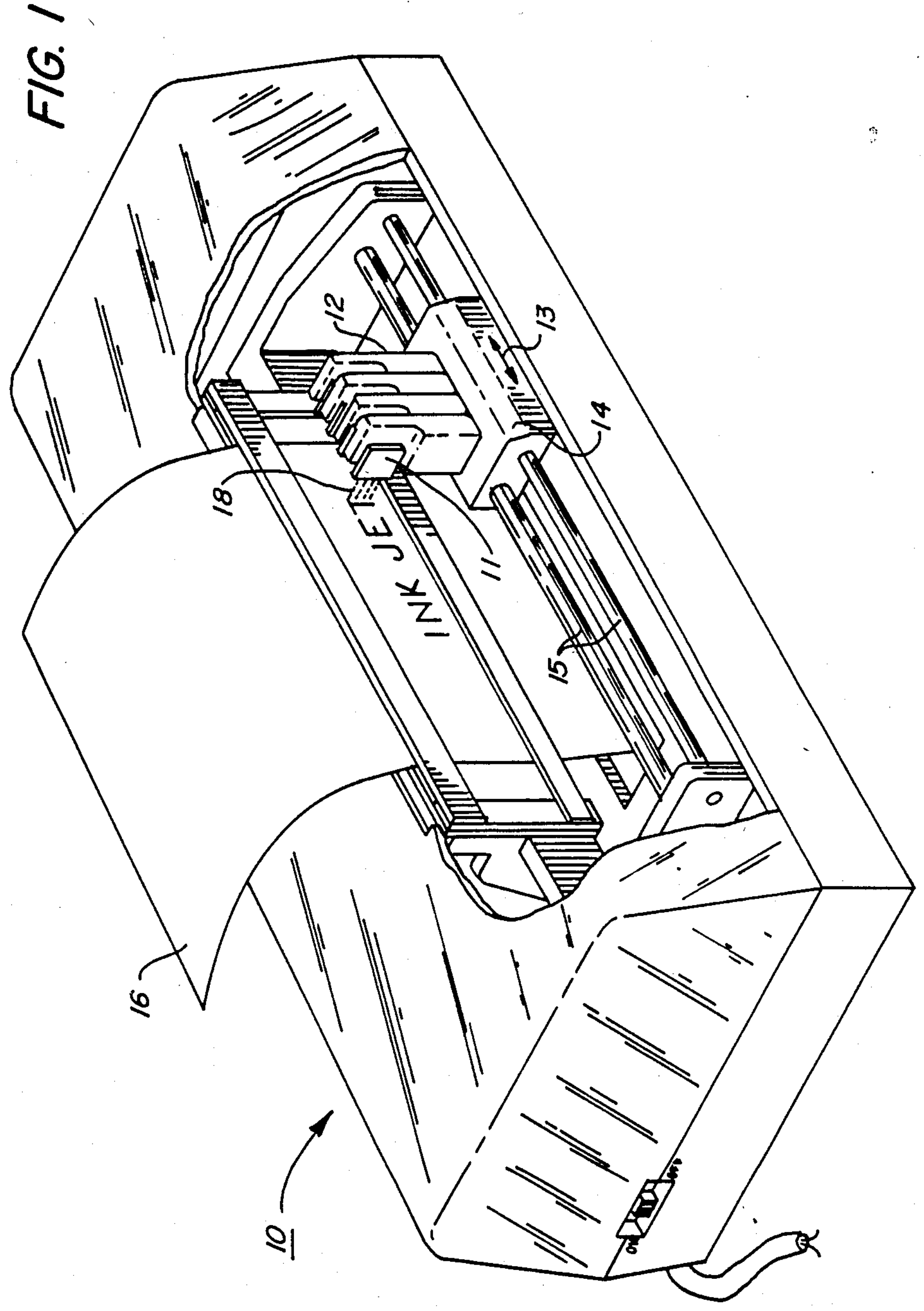
FIG. 1 is a schematic perspective view of a multicolor, thermal ink jet printer showing a plurality of disposable ink cartridges with integral printheads which form the present invention mounted on a movable carriage therein.

Referring to FIG. 1, a multicolor thermal ink jet printer 10 is shown. Several disposable ink supply cartridges 12, each with an integrally attached thermal printhead 11, are removably mounted on a translatable carriage. During the printing mode, the carriage reciprocates back and forth on guide rails 15 as depicted by arrow 13. A recording medium 16, such as, for example, paper, is held stationary while the carriage is moving in one direction and, prior to the carriage moving in a reverse direction, the recording medium is stepped a distance equal to the height of the stripe of data printed on the recording medium by the thermal printheads. Each printhead has a linear array of nozzles which are aligned in a direction perpendicular to the reciprocating direction of the carriage. The nozzles confront the recording medium and is spaced therefrom a distance of between 0.01 and 0.2 inch. In the preferred embodiment this distance is about 0.02 inch. The nozzles center to center spacing is about 3 milli-inches (mils), so that 300 spots or pixels per inch may be printed on the recording medium. The thermal printhead, described in more detail later, propels ink droplets 18 toward the recording medium whenever droplets are required, during the traverse of the carriage to print information. The signal carrying ribbon cables attached to terminals of the printheads have been omitted for clarity. The required number of nozzles is a design choice based upon the desired number of traverses back and forth across the recording medium to print a full page of information. In the preferred embodiment, 40 to 64 nozzles are contemplated, so that the standard typewriter alphanumeric characters may be completely printed during one traverse of the carriage.

Each cartridge 12 contains a different colored ink; one may be black and one to three additional cartridges may contain different selected colored inks. Such an arrangement permits black and white printing, color highlighting of basic black and white prints, or multiple colored prints. For multicolored printing, cyan, magenta and yellow colored inks would normally be used. Other combinations of cartridge colors could be used depending upon the user's needs, such as for example, two or three cartridges containing black ink and one or two cartridges containing red ink. Of course, a single cartridge 12 may be installed in the thermal ink jet printer 10, if single colored printing is desired.

Each cartridge and printhead combination is removed and discarded after the ink supply in the cartridge has been depleted. This eliminates the need to refill the cartridge or replace printheads that have lifetimes of between $10^7$ and $10^9$ droplet firings per nozzle. This amounts to about 500–100 pages of data per cartridge.

Figure 3:
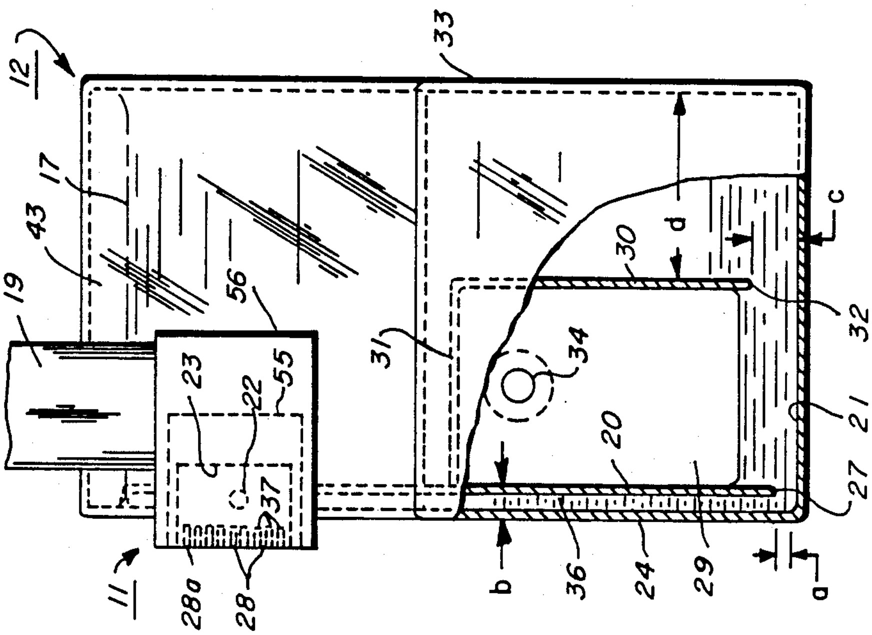
FIG. 3 is a partially sectioned, side view of the ink cartridge shown in FIG. 2 showing the secondary chamber and the passageway through which ink is fed to the printhead.
Figure 2:
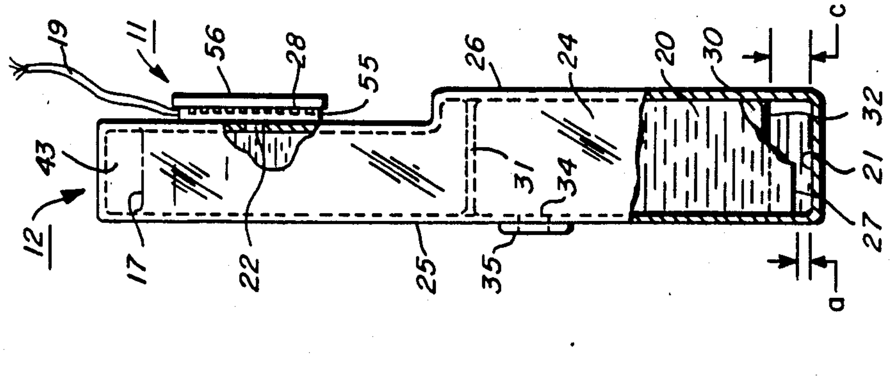
FIG. 2 is a partially sectioned end view of a one of the disposal ink cartridge with its integral printhead as viewed from the recording medium.

In FIGS. 2 and 3, a front elevation view and a side elevation view of the cartridge 12 with an integrally attached thermal printhead 11 are shown, respectively. The front view is the one which confronts the recording medium when it is installed in the printer 10. Any plastic material such as, for example, "NOREL" a trademark for a thermoplastic material sold by the General Electric Company may be used for the cartridge material.

The ink 17 is hermetically sealed within the cartridge 12 under a slight negative pressure in the range of 0.2 to 6 inches of water, with 1 to 4 inches being the preferred range. The cartridge holds between 20 and 40 cc, with 30 cc being the volume of ink in the preferred embodiment. An internal wall 20 forms a narrow passageway 36 for the ink to travel from the vicinity of the cartridge internal bottom 21 to an opening 22 in order to keep the printhead chamber 23 filled with ink. The passageway wall 20 is parallel to and spaced from the front cartridge wall 24 by the distance "b," and extends between the cartridge side walls 25, 26. The distance "b" is between 50–100 milli-inches (mils) in the preferred embodiment. The passageway wall 20 may extend to the cartridge top or stop at a location just above opening 22, as shown in the drawings. The bottom edge 27 of the passageway wall is parallel with the carriage internal bottom 21 and spaced therefrom a predetremined distance to form gap "a." The gap "a" may be between 5–100 mils, as shown in the drawing, or the gap may be substituted for a number of holes (not shown) having diameters of up to 10 mils. The gap or the plurality of holes may optionally be covered by a filter (not shown) to prevent particles or ink agglomerates from reaching and clogging the printhead nozzles 28.

A secondary chamber or reservoir 29 is formed in the cartridge 12 by "L"-shaped wall 30 which is attached at one edge to passageway wall 20 and extends between the cartridge side walls 25, 26. The leg 31 of L-shaped wall 30 whose edge is attached to the passageway wall is parallel to the cartridge internal bottom 21. The edge 32 of the other leg of L-shaped wall 30 forms a gap "c" with the cartridge bottom 21. This gap "c" must be larger than gap "a" and preferably is in the range of 50 to 300 mils. The distance "d" between the L-shaped wall edge 32 and the cartridge back wall 33 must be at least 100 mils. The purpose of the cartridge secondary reservoir 29 is to maintain a volume of air at atmospheric pressure. The atmospheric pressure of this bubble of air in reservoir 29 is maintained through an aperture 34 in cartridge side wall 25 and is covered by a membrane filter 35. This membrane filter allows the passage of air and gases therethrough, but is imprevious to the ink 17. Porous PTFE membrane or laminates thereof may be used as the membrane filter and is readily available from the companies of W. L. Gore Associates, Inc. or Garlock, Inc.

The precise shape of the cartridge 12, passageway 36 and secondary reservoir 29 is not important, so long as the gaps "a" and "c" are maintained and the passageway 36 provides the appropriate constriction of the flow of ink to control the evaporation of the volatile components of the ink. Capillary ink feeding action by the passageway 36 is not required. Also, the minimum spacing (distance "d") between the secondary reservoir and cartridge back wall 33 must be observed to enable proper functioning of the cartridge during use as explained later. Therefore, the cartridge and integral thermal printhead may be reshaped as required to fit around components of printers of different construction during installation into carriage and translation during the printing mode or operation.

Figure 4:
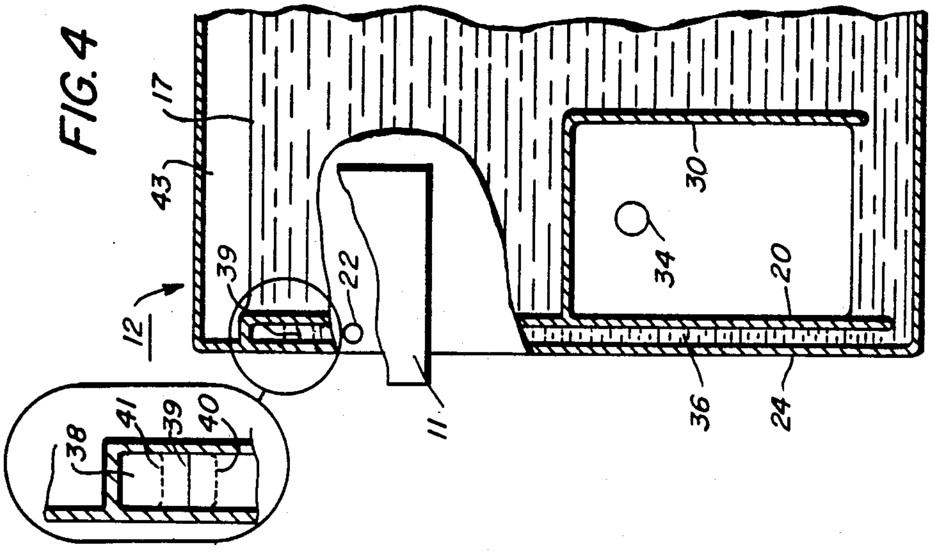
FIG. 4 is a partially sectioned side view of an alternate embodiment of the cartridge of FIG. 3.

FIG. 4 shows an alternate embodiment of the cartridge depicted in FIGS. 2 and 3. A pocket 38 of air having the same negative pressure as that of the main portion of the cartridge is located at the upper end of passageway 36. During a stable printing mode or during a non-printing mode, the ink 17 has a level 39 with the air pocket 38 above it. At the start of printing from a non-printing condition, the level drops to that lower dashed line level 40 because of the fluid inertia of the ink and the frictional forces between the ink and the surfaces of the passageway 36. The reverse situation occurs when the printhead is discharging droplets then suddenly stops. The ink surges upward in the passageway to level 41, depicted in dashed line. The dynamic temporary levels 40, 41 shown in dashed line shortly return to the stable level 39. The air pocket 38 may also be incorporated into the printhead chamber 23, but the pocket must never drop as low as the first nozzle 28*a* (see FIG. 3). Therefore, the printhead chamber should have additional height above the first nozzle, if this alternate feature of having an air pocket near the nozzles is utilized to prevent transient conditions at initiation or termination of the droplet propelling operation by the printhead.

Figure 6:
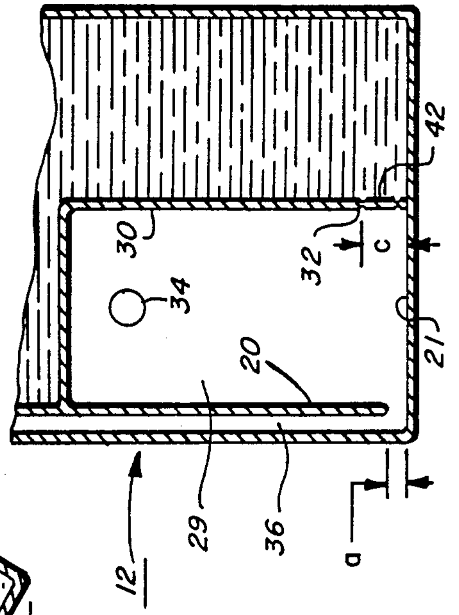
FIG. 6 is a partially shown, cross-sectional view of another embodiment of the cartridge shown in FIG. 3.

In FIG. 6, a breakaway seal 42 is formed to fill gap "c" as an alternate embodiment for shipment and pre-installation handling. Until the cartridge 12 with its integral printhead 11 is ready for installation, the danger of ink leaking through the printhead nozzles in case the cartridge is laid on its side 25 or 26 or stored upside down is eliminated. The breakaway seal 42 could be removed in a number of well known methods such as, for example, by inserting a pin (not shown) through a self-sealing material (not shown) covering an opening in a cartridge wall also not shown. The pin would break the seal 42 at the edge 32 of the L-shaped wall 30 that forms the gap "c" with the cartridge internal bottom 21. Upon withdrawal of the pin, the seal seals itself and prevents the intake of atmospheric air into the slightly negative environment of the cartridge. Since the secondary reservoir 29 of the cartridge is destined to house an air bubble at atmospheric pressure during use, the self-sealing seal could be incorporated in the cartridge walls that forms the secondary reservoir. This would prevent risk of breach of integrity of the hermetically sealed cartridge.

Figure 7:
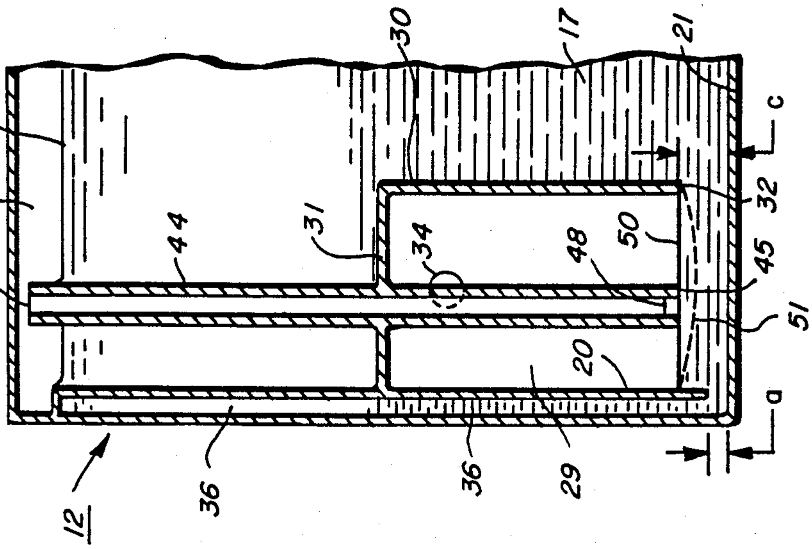
FIG. 7 is another partially shown side view of an alternate embodiment of the cartridge of FIG. 3.

Another embodiment is shown in FIG. 7. A small tube 44 penetrates leg 31 of the L-shaped wall 30 and extends parallel to the passageway 36 between the bottom edge 32 of the L-shaped wall 30 that forms the gap "c." In this embodiment, the gaps "a" and "c" have the same dimensional distances as the embodiments of FIGS. 2 and 3. The secondary cartridge reservoir 29 is sealed against the ink 17 by a membrane diaphragm 50 which rests against the bottom end 45 of the tube, thus providing a seal between the air at atmospheric pressure in the secondary reservoir 29 and the air at a negative pressure at the top of the cartridge that communicates with the other end 46 of the tube 44. As explained in more detail later, consumption of the ink in the passageway 36 by the printhead causes the diaphragm to flex downward momentarily to dashed line 51 to release a bubble of air at atmospheric pressure up the tube 44 into the negative pressure air space 43 above the ink in the main portion of the cartridge. The negative pressure is increased enough to enable the diaphragm to return to its normal position to seal again the tube end 45.

Figure 8:
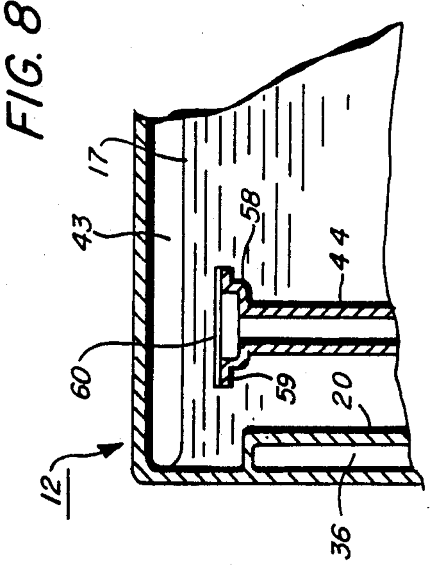
FIG. 8 is a further embodiment of the cartridge of FIG. 7.

An optional modification to the embodiment of FIG. 7 is available by placing a temporary seal 48 over the tube end 45 which may be passively removed or broken when seated on the carriage by any well known means. The removal or breakage of the seal 48 must be done without penetrating the flexible diaphragm 50. FIG. 8 shows another modification of the embodiment of FIG. 7. The tube end in air space 43 has been modified to a bell-shaped opening 58 having annular flange 59 covered by a membrane 60 which has a material similar to that of the membrane 35 that covers cartridge aperture 34. Membrane 60 and diaphragm 50 eliminate the need for membrane 35, since dust or other contaminating particles cannot reach the ink. Thus, aperture 34 may remain open and uncovered during operation, but may be optionally sealed by a removable cover (not shown) prior to installation in printer 10.

Figure 9:
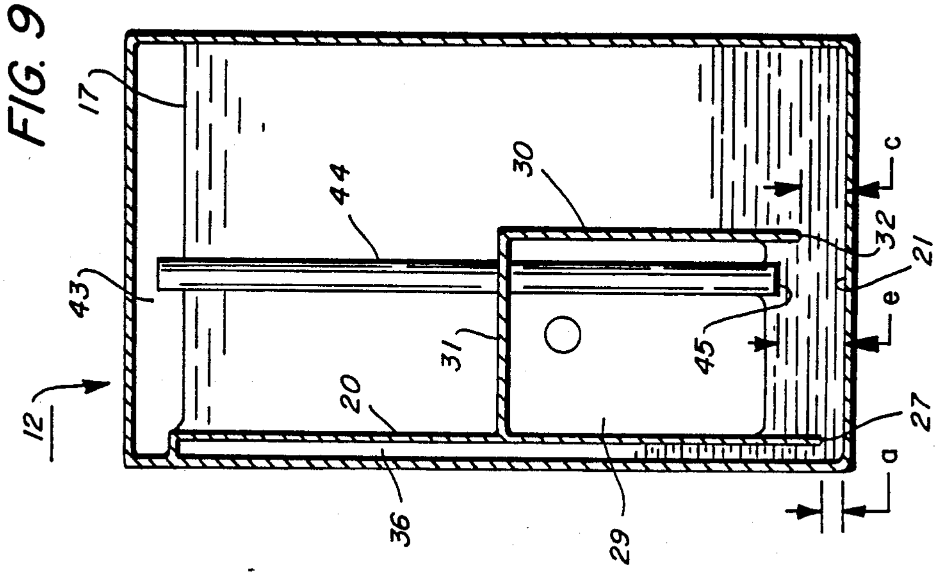
FIG. 9 is another embodiment of the cartridge of FIG. 3.

Use of a tube 44 in the main embodiment of FIGS. 2 and 3, shown in FIG. 9 provides another embodiment. The only other modification is that the gap "c" may be closer or equal to the distance of gap "a" and that the tube end 45 be spaced from the cartridge bottom 21 a distance "e," so that the tube end 45 is parallel to and spaced from the cartridge internal bottom 21 by between 50 to 300 mils. Therefore, the ink 17 normal closes the tube end 45, but momentary drops in the ink level in the secondary reservoir 29 permit a bubble of air to escape up the tube 44. Once the released bubble enters the space 43, the pressure in space 43, though still at a negative pressure, is increased enough to cause the ink level in the secondary reservoir 29 to rise and cover the tube end 45. The process is continually repeated as the ink is depleted during the printing mode.

Figure 5:
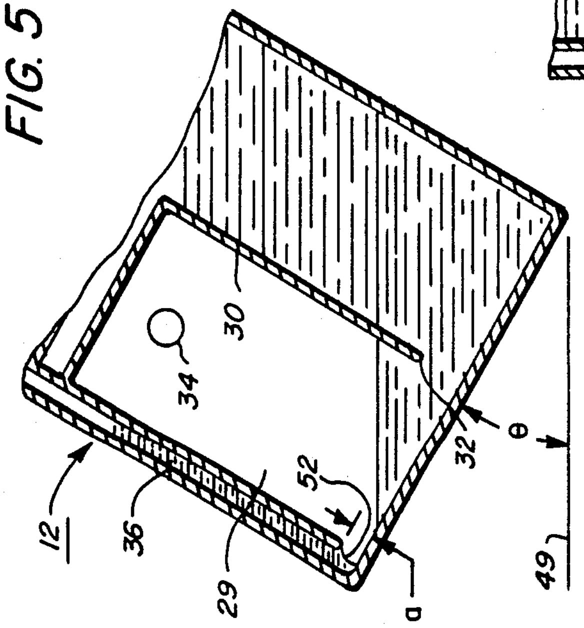
FIG. 5 is a partially shown, enlarged cross-sectional view of the cartridge shown in FIG. 3 which shows the meniscus formed at the passageway entrance when the cartridge is tilted from the position as installed on the printer carriage by $\theta$ degrees.

FIG. 5 shows that when the main embodiment of FIGS. 2 and 3 is rotated relative to a plane 49 parallel with that of the carriage 14 through an angle $\theta$, a meniscus 52 is formed at gap "a" which prevents air from the reservoir 29 from moving up the passageway 36 and reaching the printhead nozzles. Any air that reaches the nozzles would prevent proper operation of the printhead and could necessitate the early disposal of the cartridge and printhead even though the ink therein was not depleted.

The thermal printhead operation and construction is similar to that of copending patent application Ser. No. 588,166 filed Mar. 9, 1984 by W. G. Hawkins and assigned to the assignee of the present invention. Basically, the operating sequence of the bubble jet system starts with a current pulse of predetermined duration through the resistor or resistive layer in the ink filled channel, the resistive layer being near the orifice or nozzle for that channel. Heat is transferred from the resistor to the ink. The ink becomes superheated (far above its normal boiling point) and for water based ink, finally reaches the critical temperature for bubble nucleation of around 280° C. Once nucleated, the bubble or water vapor thermally isolates the ink from the heater and no further heat can be applied to the ink. The bubble expands until all the heat stored in the ink, in excess of the normal boiling point, diffuses a way or is used to convert liquid to vapor which, of course, removes heat due to heat of vaporization. The expansion of the bubble forces a droplet of ink out of the nozzle. Once the heat is removed, the bubble collapses on the resistor. The resistor at this point is no longer being heated because the current pulse has passed and, concurrently with the bubble collapse, the droplet is propelled at a high rate of speed in a direction towards a recording medium. The resistive layer encounters a severe cavitational force by the collapse of the bubble. The ink channel then refills by capillary action from the chamber 23. The entire bubble formation and collapse sequence occurs in about 10–50 microseconds. The channel can be refired after 50 to 500 microseconds minimum dwell time to enable the channel to be refilled and to enable the dynamic refilling factors to become somewhat dampened.

Referring to FIGS. 2 and 3, the printhead comprises two different substrates of material, such as silicon. One substrate 55 has a recess with an opening 22 through the bottom thereof. Parallel grooves are formed which extend between one edge of the substrate and the recess; the grooves are about 13 mils long and have an axial spacing of approximately 3 mils. The other substrate 56 has a linear array of small resistors with individual electrodes and a common return patterned on one surface. The electrodes and the return extend to at least one edge of substrate 56 and terminate with terminal connectors suitable for attachment of ribbon cable 19. The two substrates are aligned and fixedly attached to each other, so that the surface of substrate 56 having the resistors match the exit regions of the grooves in substrate 55. The grooves and recess of substrate 55 form the nozzles 28, channels 37, and chamber 23 when covered by the substrate 56. The assembled printhead is permanently and sealingly attached to the cartridge 12 with substrate 55 contacting cartridge wall 26 and the hole opening 22 in the cartridge being aligned and axially coincident with the opening 22 of substrate 55. Thus, as ink 17 is expelled in droplet form from the nozzles, the ink in the printhead chamber 23 is replenished via the opening 22 from the cartridge passageway 36.

The cartridges 12 with integral thermal printheads 11 are readily mounted on the printer carriage 14 and replaced with new cartridge/printheads when the ink supply therein is depleted by a user of the printer 10. Each cartridge may be between 0.5 and 1.5 inches thick. In the preferred embodiment, the cartridges are 0.6 inches thick and a portion of the cartridge has a thinner width at its upper portion to provide clearance for the printheads when a number of cartridges are mounted in juxtaposed position on the carriage. The ink supplies in each cartridge has been determined to last less than the lifetimes of the printhead resistors which deteriorate with use. When the ink in the cartridge has been depleted, the useful printhead lifetime is approached and the cartridge/printhead combination is removed from the printer and discarded.

To prevent unavoidable evaporation of the ink in the nozzles after periods of inactivity, the carriage is optionally periodically translated to one side of the recording medium and ink droplets are expelled from all nozzles into a gutter not shown. The guide rails 15 must be long enough to enable the carriage to translate in each direction a distance sufficient to enable each printhead to print across the full width of the recording medium. If a gutter is desired in the printer 10 for periodic firing to maintain the nozzles free of dried ink in the unused nozzles, then the guide rails, of course, extend further to enable each printhead to propel droplets in the gutter.

In recapitulation, the present invention relates to a disposable ink cartridge and integral thermal printhead. The ink pressure in the printhead nozzles are maintained at a predetermined negative pressure, while the level of the ink in the cartridge is changing as the ink is spent. This predetermined negative pressure is obtained by a hermetically sealed, self-contained quantity of ink in a cartridge having an ink restricting passageway between the nozzles and the bottom of the cartridge. An air pocket at a location near the passageway entrance is maintained at atmospheric pressure in a small reservoir adapted to periodically leak air into the main ink supply in the cartridge to keep the desired negative pressure in the cartridge in equilibrium condition as the ink supply is depleted. The passageway isolates the pressure transients generated by the carriage motion and its entrance is designed to maintain a meniscus to prevent the ingestion of air if the cartridge is tilted prior to installation in the printer. The printhead chamber and opening between the chamber and passageway prevents crosstalk between nozzles as they are individually addressed to expel droplets. Optionally, means are provided to prevent loss of the negative pressure at the nozzles caused by effects of fluid inertia of the ink which is present when sudden changes of printing duty cycle such as initial printing and stoppage of printing occurs.

Many modifications and variations are apparent from the foregoing description of the invention and all such modifications and variations are intended to be within the scope of the present invention.

I claim:

1. An improved ink cartridge for use in an ink jet printer of the type having a reciprocating carriage adapted to receive at least one ink supply cartridge with integrally mounted thermal printheads forming a part thereof, means for stepping a recording medium a predetermined, fixed distance after each traversal of the carriage across the width of the recording medium, and means for propelling ink droplets from the nozzles of each printhead on demand in response to digitized data signals, wherein the improved ink cartridge comprises:

an upper end portion having a thermal printhead fixedly mounted thereon, a self-contained supply of ink, and a lower end portion adapted for mounting upon said carriage;

said printhead having an internal chamber communicating with each of one end of a linear array of internal, parallel channels which are aligned perpendicular to the carriage reciprocating direction, the other end of the channels terminating in a nozzle that is spaced from and confronts the recording medium when installed on the carriage, the chamber having an opening for ingress of ink, and each channel having an individually addressable resistor at the nozzle for the thermal expulsion of ink droplets in response to the passage of current pulses therethrough;

means for addressing the resistors with current pulses representative of said data signals;

the supply of ink being hermetically sealed in the cartridge under a predetermined negative pressure, an elongated, internal passageway extending from the lower end portion of the cartridge to the upper end portion, the passageway having an aperture in the cartridge upper end portion for supplying ink to the printhead channels via the chamber and the chamber opening which is in communicating alignment with the passageway aperture, the opposite end of the passageway at the cartridge lower end portion having an entrance gap of predetermined dimensions; and a secondary reservoir located in the lower end portion of the cartridge for containing an air pocket of dust-free air at atmospheric pressure, said secondary reservoir being adapted to release air into the cartridge to maintain the predetermined negative pressure therein as the ink supply is depleted, the negative ink pressure at the printhead nozzles being maintained by the difference in height between the ink supply in the cartridge and the passageway entrance gap.

2. The improved ink cartridge of claim 1, wherein predetermined dimensions of the passageway entrance causes a meniscus to form when said cartridge is tilted to subject the entrance gap to the atmospheric air in said secondary reservoir so that the entrance of air in the passageway is prevented.

3. The improved ink cartridge of claim 1, wherein the cartridge has parallel sidewalls, so that more than one may be mounted on the printer carriage in juxaposition fashion.

4. The improved ink cartridge of claim 3, wherein each of a plurality of ink cartridges mounted on the printer carriage contain different colored ink for multicolored printing by said printer.

5. The improved ink cartridge of claim 1, wherein the thermal printhead integrally mounted thereon contains 40 to 64 nozzles which lie in the same plane and are spaced substantially on 3 mil centers for printing at least 300 picture elements or pixels per inch on the recording medium via droplets expelled from the nozzles.

6. The improved ink cartridge of claim 1, wherein the cartridge further comprises:

an opening in the cartridge for the passage of atmospheric air into the secondary reservoir; and a first membrane filter covering the cartridge opening, the membrane being pervious to air and impervious to the ink.

7. The improved ink cartridge of claim 6, wherein the cartridge further comprises an air space in the passageway above the passageway aperture and having a negative pressure substantially equal to that in the hermetically sealed cartridge, so that the level of ink in the passageway may rise or fall in accordance with the sudden change in use of ink by the printhead to thereby reduce the effects of fluid inertia on the ink.

8. The improved ink cartridge of claim 6, wherein the printhead chamber has an air space above the uppermost channel with air therein at a negative pressure substantially equal the negative pressure in the cartridge, the level of ink at the interface between the air and ink in the printhead chamber being capable of rising and falling from an equilibrium position to reduce the effects of fluid inertia on the ink caused by sudden changes of printing by the printhead without letting air from the air space release into any of the printhead channels.

9. The improved ink cartridge of claim 6, wherein the cartridge further comprises sidewalls, end walls, and a top and a bottom wall; and wherein the secondary reservoir is formed by a first internal wall extending between sidewalls of the cartridge, one edge of the first internal wall being parallel to and spaced from a surface of the bottom wall to form a first gap therebetween; and wherein the passageway is formed by a second internal wall extending between the sidewalls of the cartridge, the second internal wall having one end parallel to and spaced from the surface of the bottom wall to form a second gap therebetween, the passageway second gap is smaller than the first gap, so that, as the ink is depleted from the cartridge, air from the secondary reservoir is released into the cartridge as required to maintain the negative pressure contained in the cartridge without risk of releasing air into the passageway.

10. The improved ink cartridge of claim 9, wherein the cartridge further comprises:

a tube which penetrates the secondary reservoir first internal wall and extends from the vicinity of the cartridge bottom wall to the vicinity of the cartridge top wall; and wherein the tube end at the cartridge bottom wall is spaced therefrom a greater distance than either the distance of the passageway second gap or the secondary reservoir first gap, so that air is released in the cartridge through the tube to maintain the negative pressure constant in the cartridge as the ink is used.

11. The improved ink cartridge of claim 9, wherein the gap formed by the secondary reservoir first gap contains a breakaway seal to eliminate ink leakage through the nozzles prior to installation onto the printer carriage, the breakaway seal being broken prior to use of the cartridge in the printer.

12. The improved ink cartridge of claim 6, wherein the cartridge further comprises:

a tube penetrating the secondary reservoir and extending between the upper and lower end portions of the cartridge; and a flexible diaphragm sealing the atmospheric air in the secondary reservoir from the ink in the cartridge, the diaphragm contacting and sealing the tube end in the lower end portion of the cartridge, the atmospheric air in the secondary reservoir periodically pushing the diaphragm from the tube end to release air therefrom into the tube as the ink in the cartridge is depleted in order to maintain the negative pressure constant on the ink in the cartridge.

13. The improved ink cartridge of claim 12, wherein the cartridge further comprises a second membrane filter covering the tube end opposite the one sealed by the flexible diaphragm, said second membrane filter being pervious to air but impervious to the ink, the second membrane filter eliminating the need for the first membrane filter.

* * * * *